(12) United States Patent
Dulberg et al.

(10) Patent No.: US 12,286,773 B2
(45) Date of Patent: Apr. 29, 2025

(54) ATMOSPHERIC WATER GENERATOR

(71) Applicant: WATERGEN LTD., Petah Tiqwa (IL)

(72) Inventors: Sharon Dulberg, Beer Sheva (IL);
Yanir Richard Blumenthal, Kfar Saba (IL); Moran Pery, Ramat Gan (IL); Guy Evgeni Chernin, Rosh Ha'ayin (IL); Chen Nechemia, Rehovot (IL)

(73) Assignee: WATERGEN LTD., Petah Tiqwa (IL)

( * ) Notice: Subject to any disclaimer, the term of this patent is extended or adjusted under 35 U.S.C. 154(b) by 564 days.

(21) Appl. No.: 17/421,465

(22) PCT Filed: Jan. 8, 2020

(86) PCT No.: PCT/IL2020/050031
§ 371 (c)(1),
(2) Date: Jul. 8, 2021

(87) PCT Pub. No.: WO2020/144685
PCT Pub. Date: Jul. 16, 2020

(65) Prior Publication Data
US 2022/0081881 A1    Mar. 17, 2022

Related U.S. Application Data

(60) Provisional application No. 62/789,603, filed on Jan. 8, 2019.

(51) Int. Cl.
*E03B 3/28* (2006.01)
*B01D 53/26* (2006.01)

(52) U.S. Cl.
CPC .............. *E03B 3/28* (2013.01); *B01D 53/265* (2013.01)

(58) Field of Classification Search
CPC ......... E03B 3/28; B01D 53/265; B01D 5/006; B01D 1/14; B01D 5/00; Y02A 20/00; Y02B 10/50
See application file for complete search history.

(56) References Cited

U.S. PATENT DOCUMENTS 1,190,386 A * 7/1916 Dickerson ................ F24F 6/06
96/365
2,179,893 A * 11/1939 Lyon ...................... A01K 31/19
392/350
(Continued)

FOREIGN PATENT DOCUMENTS

CN     202850099 U      4/2013
CN     107447810 A  * 12/2017  ............... E03B 3/28
(Continued)

OTHER PUBLICATIONS

Google translation of JP2015085617 (Year: 2015).*
(Continued)

*Primary Examiner* — Stephen Hobson
(74) *Attorney, Agent, or Firm* — PEARL COHEN ZEDEK LATZER BARATZ LLP (57) ABSTRACT

The invention discloses an AWG having improvements designed to reduce noise, improve uniform airflow through the evaporator of the AWG and reduce energy consumption. In one embodiment the AWG includes an air inlet located in one of the sidewalls of the enclosure and a blower located in proximity to the air outlet at the bottom wall of the enclosure.

12 Claims, 3 Drawing Sheets

(56) References Cited

U.S. PATENT DOCUMENTS

| | | | | |
|---|---|---|---|---|
| 2,278,581 A * | 4/1942 | Dexter | ............. | F24F 7/007 454/348 |
| 3,023,514 A * | 3/1962 | Gibson | ............. | D06F 58/10 219/400 |
| 3,035,418 A * | 5/1962 | Wright | ............. | E03B 3/28 62/394 |
| 3,725,640 A * | 4/1973 | Kunz | ............. | F24H 3/0417 415/121.2 |
| 4,827,733 A | 5/1989 | Dinh | | |
| 5,106,512 A * | 4/1992 | Reidy | ............. | C02F 1/18 95/24 |
| 5,149,446 A * | 9/1992 | Reidy | ............. | E03B 3/28 62/93 |
| 5,188,771 A * | 2/1993 | De Witt | ............. | F04D 31/00 261/25 |
| 5,203,989 A * | 4/1993 | Reidy | ............. | C02F 1/18 62/93 |
| 5,244,275 A * | 9/1993 | Bauer | ............. | A47J 43/085 366/601 |
| 5,259,203 A * | 11/1993 | Engel | ............. | F24F 3/1405 62/291 |
| 5,669,221 A * | 9/1997 | LeBleu | ............. | E03B 3/28 62/150 |
| 5,701,749 A * | 12/1997 | Zakryk | ............. | B01D 53/265 62/93 |
| 5,845,504 A * | 12/1998 | LeBleu | ............. | C02F 1/008 62/92 |
| 6,029,461 A * | 2/2000 | Zakryk | ............. | B01D 53/265 62/93 |
| 6,289,689 B1 * | 9/2001 | Zakryk | ............. | B01D 5/0039 62/317 |
| 6,779,358 B2 * | 8/2004 | Zakryk | ............. | B01D 53/265 62/317 |
| 7,089,763 B2 * | 8/2006 | Forsberg | ............. | F24F 1/027 62/635 |
| 7,886,547 B2 * | 2/2011 | Sullivan | ............. | E03B 3/28 62/93 |
| 7,886,557 B2 * | 2/2011 | Anderson | ............. | B01D 5/0072 62/272 |
| 9,377,217 B2 * | 6/2016 | Blumenthal | ............. | F24S 23/71 |
| 9,561,451 B2 * | 2/2017 | Dorfman | ............. | E03B 3/28 |
| 10,525,373 B2 * | 1/2020 | Dorfman | ............. | B01D 5/0051 |
| 2003/0094011 A1 * | 5/2003 | Zakryk | ............. | B01D 5/0039 62/93 |
| 2004/0244398 A1 * | 12/2004 | Radermacher | ............. | B01D 5/0039 62/93 |
| 2006/0163754 A1 * | 7/2006 | Barthelson | ............. | F24F 6/16 261/30 |
| 2008/0022694 A1 * | 1/2008 | Anderson | ............. | B01D 5/009 62/3.4 |
| 2008/0245092 A1 * | 10/2008 | Forsberg | ............. | F24F 1/027 62/3.4 |
| 2010/0275779 A1 * | 11/2010 | Melikyan | ............. | C02F 9/20 96/396 |
| 2012/0237341 A1 * | 9/2012 | Simon | ............. | B64C 3/14 415/211.2 |
| 2013/0004307 A1 * | 1/2013 | Fukuda | ............. | F04D 17/16 415/206 |
| 2013/0186130 A1 | 7/2013 | Tsutsumi et al. | | |
| 2014/0138236 A1 * | 5/2014 | White | ............. | B01D 5/0006 202/185.1 |
| 2014/0261764 A1 * | 9/2014 | Kohavi | ............. | F28F 9/0275 137/340 |
| 2015/0085617 A1 | 3/2015 | Savord | | |
| 2016/0097547 A1 * | 4/2016 | Selg | ............. | F24F 13/30 55/357 |
| 2016/0129369 A1 * | 5/2016 | Dorfman | ............. | B01D 5/0051 62/189 |
| 2016/0131372 A1 * | 5/2016 | Choi | ............. | F24F 13/222 62/189 |
| 2017/0089605 A1 * | 3/2017 | Kim | ............. | F24F 11/65 |
| 2018/0171603 A1 | 6/2018 | Di Benedetti et al. | | |
| 2018/0266708 A1 * | 9/2018 | Dulberg | ............. | F24F 3/1405 |
| 2019/0010955 A1 * | 1/2019 | Liang | ............. | F04D 29/4226 |

FOREIGN PATENT DOCUMENTS

| | | | | |
|---|---|---|---|---|
| CN | 206771833 | | 12/2017 | |
| CN | 207132442 U | * | 3/2018 | |
| CN | 109653296 A | | 4/2019 | |
| DE | 102012105838 A1 | * | 1/2013 | ............. F04D 17/16 |
| EP | 1478891 | | 10/2008 | |
| JP | 60-091654 | | 4/2005 | |
| JP | 2013-186130 | | 9/2013 | |
| JP | 2015-85617 | | 5/2015 | |
| JP | 2015085617 | * | 5/2015 | |
| JP | 2015085617 A | * | 5/2015 | |
| KR | 10 2000 0014834 | | 3/2000 | |
| KR | 10 2005 0031163 | | 4/2005 | |
| WO | WO 2008108740 | | 9/2008 | |
| WO | WO 2014/140706 | | 9/2014 | |

OTHER PUBLICATIONS

Extended European Search Report for Application No. EP20738963.6, mailed on Dec. 7, 2022.

International Search Report of PCT Application No. PCT/IL2020/050031, mailed Apr. 20, 2020.

* cited by examiner

FIG. 1A

FIG. 1B Local section A-A

ATMOSPHERIC WATER GENERATOR

CROSS-REFERENCE TO RELATED APPLICATIONS

This application is a National Phase Application of PCT International Application No. PCT/IL2020/050031, International Filing Date Jan. 8, 2020, claiming benefit of U.S. Provisional Patent Application No. 62/789,603, filed Jan. 8, 2019, which is hereby incorporated by reference.

TECHNICAL FIELD

The present invention relates to the field of atmospheric water generators.

BACKGROUND OF THE INVENTION

Extraction of water from air by atmospheric water generators, is well known and typically involves enforcement of condensation conditions of air containing water vapor (i.e. humid air) by lowering its temperature below the dew point temperature, thereby causing some vapor to condensate and liquid water is then released from the carrying air. While this method is highly available, there are several obstacles for making this method competitive with alternative water dispensers which draw their water from the regular pipeline or from mineral water tanks. To name a few, these challenges include reducing the high amount of heat energy needed to be evacuated, leading to a high energetic cost for a given amount of extracted water, the noise level involved with the production of water, matching production with the consumption demand, reducing the volume of the apparatus and more. The issue of reducing size and noise level is especially important for domestic and for office use of atmospheric water generators.

SUMMARY OF THE INVENTION

The aim of the invention is to provide solutions to the challenges and drawbacks of atmospheric water generators described above.

In a first aspect the invention provides an atmospheric water generator (AWG) comprising an enclosure, an evaporator assembly, a condenser and a blower. The enclosure includes a bottom wall, sidewalls, top wall, at least one air inlet, and at least one air outlet. At least one air inlet is located at one of the sidewalls or top wall, the at least one air outlet is located at at least a portion of the bottom wall that is elevated from the ground. The evaporator assembly is accommodated in the enclosure and comprises an air inlet pathway, an evaporator and an air outlet pathway. The air inlet pathway is adapted to receive an airflow from the air inlet of the enclosure and to direct the air flow to flow through the evaporator. The air outlet pathway is adapted to receive the airflow from the evaporator and direct the airflow to the outlet of the enclosure. The blower is located at the air outlet or in proximity thereto. In some embodiments the blower is positioned below the outlet of the enclosure. The blower and the condenser are located downstream the evaporator assembly, and the evaporator assembly is located downstream the air-inlet.

The AWG is configured to direct the airflow from the air inlet through the evaporator assembly, and down to exit through the air outlet at the bottom wall.

In another aspect, the invention provides an AWG comprising an air inlet, an electricity panel and an evaporator, wherein the electricity panel is located between the air inlet and the evaporator. The electricity panel is thus being cooled by the main airflow driven by said blower.

In yet another aspect, the invention provides an AWG comprising a water generation refrigeration cycle comprising an evaporator and a porous barrier positioned parallel and proximal to air entries of the evaporator.

In a further aspect the invention provides an AWG comprising a blower and an evaporator of an airflow refrigeration cycle, wherein the blower is located downstream the evaporator and approximately centralized to the flow-lines of the airflow exiting the evaporator.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention generally relates to improvements made in atmospheric water generators. These improvements are especially beneficiary for atmospheric water generators that are intended for use indoors such as in an office, clinic, classroom or at home or in confined spaces such as a vehicle. The term "atmospheric water generator" (hereinafter "AWG") refers herein to any device which is capable of extracting water vapors (humidity) in the air, transform it into potable water by condensing some of the humidity into water. The condensation of water is achieved by reducing the temperature of a relatively humid air flow down to its dew point. The atmospheric water generator thus comprises a refrigeration cycle as commonly used in the art including a refrigerant line, an expansion valve, an evaporator (cold heat exchanger), a condenser (hot heat exchanger), and a compressor. The atmospheric water generator includes a blower, forcing the air to pass through the evaporator and through the condenser. Often, a collection means such as a water sump gravitationally collects the water drops which are formed in the evaporator. The collected water is transferred in most cases from the water sump to a water tank for storing the condensed water either with the aid of a pump or gravitationally. Various filters may also be installed—for filtering the water (sedimentation filters, carbon filters, reverse osmosis filters etc.), adding minerals, sanitizing (e.g. with UV radiation), and for filtering the incoming air for purifying polluted air from particles and harmful chemicals. The AWG also includes dispensing means for providing the water (e.g. as potable water) upon demand, which include a dispensing line and at least one faucet.

The inventors of the present invention found that when using one or few evaporator assemblies, such as the heat exchanger assembly described in U.S. Pat. No. 9,140,396 and U.S. patent application Ser. No. 15/822,426, both assigned to the applicant of the present invention, in the water generation system, then the AWG structure should be designed to uniform the airflows entering of (each one of) the evaporators.

Moreover, the inventors of the present invention surprisingly found that when installing an evaporator assembly as the one described in the aforementioned U.S. Pat. No. 9,140,396 and U.S. patent application Ser. No. 15/822,426, having an air inlet pathway, an evaporator and an air outlet pathway where the air inlet pathway is adapted to receive an airflow from the air inlet of the enclosure and direct the air flow to flow through the evaporator, the air outlet pathway adapted to receive the airflow from the evaporator and direct the airflow to the outlet of the enclosure, this allows designing the AWG in a configuration in which noise is considerably attenuated. The AWG comprising the evaporator assembly is configured to allow the airflow to enter the apparatus from one of the sidewalls or top wall (especially from the back wall) of the AWG enclosure, and to allow the airflow exit the apparatus through the bottom of the enclosure.

The inventors further found that placing a fine air filter proximal, parallel and upstream to the entry of a heat exchanger evaporator and/or placing a blower downstream and parallel to a condenser being placed downstream the evaporator, increases the uniformity of the air flow in the heat exchanger evaporator. The farther the blower is from the evaporator; the better results are achieved.

Thirdly, the inventors found that using a circular, round edges or other shape surrounding the blower decreases the total volume of the apparatus.

Blower at the Bottom of the Enclosure

Therefore, in a first aspect the invention provides an AWG comprising an enclosure having sidewalls a bottom wall and a top wall, at least one air inlet located in one of the sidewalls or the top wall of the enclosure, and at least one air outlet located at the bottom of the enclosure. The enclosure is adapted to accommodate components of the AWG including an evaporator assembly and a water storage tank. The AWG further comprises a blower adapted to motivate an airflow from the inlet through the evaporator assembly and out through the outlet at the bottom of the enclosure.

The term "sidewalls" should be construed to include two opposite sides of a cubic enclosure as well as the front and back of the enclosure, or in cylindrical enclosure—the round longitudinal wall of the cylinder, that are positioned substantially perpendicular to the floor on which the AWG stands. The term "substantially" means a deviation of up to 20% of the value it refers to.

To allow air to flow freely away from the AWG, the portion of the bottom comprising the air outlet is elevated from the ground. In some embodiments the entire bottom is elevated from the ground, for example by attaching legs to the enclosure. In most embodiments this arrangement dictates that the air inlet is located above the air outlet, but in some embodiments the elevated portion of the bottom is higher than the air inlet, and the air inlet is located at the bottom-end of one of the sidewalls. In some embodiments, the air inlet is located at or above the top half portion of at least one of the sidewalls. At least one of the sidewalls ends above the ground or comprises an opening proximal to the bottom-end of the sidewall allowing the airflow to flow from the blower away from the apparatus. The blower is located at the air outlet or in proximity thereto. In some embodiments the blower is positioned downstream (i.e. below) the air-outlet.

In some embodiments the blower is adapted to direct air flow exiting the AWG to flow parallel to the ground (e.g. a centrifugal blower).

In some embodiments, the bottom is connected to legs that are attached to the frame of the enclosure to aimed elevate the bottom from the ground.

The dimension of the gap between the bottom of the enclosure and the ground at the periphery of the bottom also has an effect on the noise level—a larger gap reduces the noise level (till a certain point). The same is true regarding the gap between the blower and the ground. The exact gap between the ground and the blower/bottom for optimizing the noise level without compromising on the efficiency of the apparatus would vary from one specific design to the other, but the person of skill in the art would be able to find the optimum gap for a given design by measuring the noise level as a function of the gap.

The type of blower can be any commonly used blower in the field. In some embodiments, in order to reduce the noise level even further, one may select a centrifugal blower, which directs the airflow sideways such that the air exiting the air outlet would flow parallel to the ground.

Another feature which may contribute to noise reduction is a design of the bottom surface which hinders or partially hinders the blower. The blower having a top side, a bottom side and a lateral side is positioned in a cavity defined by the surface of the bottom wall such that the lateral side of the blower is at least partially hindered by the enclosure. The cavity assists in preventing noise arriving from the rotation of the blower and passage of airflow through the blower. For example, the bottom surface may have a tapered shape around the air outlet (the air outlet placed on the smaller section of the tapered wall) giving sufficient space for placing the blower in an upside-down funnel like vicinity around the blower. Consequently, the air flow which is blown out flows outwardly, in an approximate parallel flow to the ground and at least a portion of the noise is blocked in the cavity.

In order to effectively collect the water that is condensed in the evaporator by letting the drops to drop gravitationally, the main plane of the evaporator may be positioned vertically to the ground. In embodiments where the airflow enters the enclosure at an air inlet located at the top wall or at one of the side walls and the evaporator is located below the air inlet of the enclosure, then the airflow needs to be turned to flow substantially horizontally (with respect to the ground) to cross the vertical evaporator, and after exiting the evaporator it needs to be turned again to flow substantially vertically downward (with respect to the ground) towards the outlet of the enclose at the bottom wall.

To this end, an evaporator assembly is provided having (i) an air inlet pathway, (ii) an evaporator and (iii) an air outlet pathway. The pathways may be made of an element or a plurality if elements having a surface which may be substantially planar and is capable of directing the air flow. The air inlet pathway is adapted to receive the airflow from the air inlet of the enclosure, and lead said airflow to the evaporator. The air outlet pathway element is adapted to receive the airflow from the evaporator and lead it toward the air outlet of the enclosure. In order to be able to efficiently receive the air flow, the air inlet pathway and air outlet pathway may comprise protrusions which divert the direction of the airflow to the desired direction. In some embodiments the entry to the air inlet pathway approximately faces the air inlet of the enclosure so the air flow can flow efficiently into the air inlet pathway. The term approximately in this context means that the entry may be tilted to a certain extent with respect to the plane of the air inlet of the enclosure. In some embodiments the entry may be tilted by 10°, 20°, 30°, 40°, 50° or 60° with respect to the plane of the air inlet of the enclosure. In some embodiments the air inlet pathway directs the airflow to flow parallel to the ground and the evaporator is positioned vertically to the ground. In some embodiments the air inlet pathway comprises protrusions that are designed to direct the airflow to the evaporator. In some embodiments the protrusions direct the airflow to flow parallel to the ground and the evaporator is positioned vertically to the ground. In some embodiments the air inlet pathway is in heat exchange with the air outlet pathway, such that airflow in the air inlet pathway is pre-cooled by air exiting the evaporator before reaching the evaporator and air flow exiting the evaporator is post-heated by the air flow in the air-inlet pathway. In some embodiments, the air outlet pathway leads the airflow from the evaporator to flow towards the bottom wall of the enclosure. In some embodiments the exit of the air outlet pathway approximately faces the bottom wall of the enclosure. In some embodiments the air outlet pathway comprises protrusions directing the airflow from the evaporator towards the bottom end of the enclosure.

In some embodiments, the evaporator is a fins and tubes heat exchanger. In some embodiments the air inlet pathway and the air outlet pathway is a plates heat exchanger surrounding the fins and tubes heat exchanger. The portion of the plates before the airflow reaches the fins is the air inlet pathway and the portion of the plates after the airflow leaves the fins is the air outlet pathway. In some embodiments, the evaporator assembly is a dehumidification apparatus disclosed in U.S. Pat. No. 9,140,396 and U.S. patent application Ser. No. 15/822,426, both assigned to the applicant of the present invention, where the cooled core within the apparatus mentioned therein is referred to as the evaporator herein, and the planar elements define the inlet pathways and the outlet pathways, as described above.

One of the challenges which needs to be mitigated in any AWG, is preventing relatively dry air that exits the apparatus from reentry to the refrigeration cycle, because this would lower the productivity of the process (less water will be generated). To this end, the cavity hindering the blower may be asymmetric, such that it allows less airflow to exit through the side of the enclosure comprising the air inlet than airflow exiting the other sides of the enclosure. Similarly, in some embodiments the gap between the bottom-end of the sidewalls and the ground is not symmetric at all the sidewalls of the enclosure. In some embodiments there is a smaller gap for allowing air to exit between the ground and the sidewall comprising the air-inlet. In some embodiments, all air inlets are located at one sidewall and in some embodiments this sidewall is the back sidewall of the apparatus (i.e. opposite to the sidewall that comprises a faucet and the human-machine interface). In some of such embodiments, the outlet gap at the bottom of the backside of the wall is smaller than that of the other sidewalls and even minimal.

Embodiments of the invention provide another feature aimed to mitigate the issue of dry air reentering the apparatus: a barrier surface is attached to the sidewall of the enclosure comprising the air inlet extending laterally and outwardly from the sidewall. This may block the air-flow exiting at the bottom from reaching to the air entry. In addition, the barrier, which may be in a form of a shelf, may assist in keeping a minimal gap between the sidewall comprising the air-inlet and the wall proximal thereto, to facilitate the entry of airflow into the air-inlet.

The air-inlet may be located on any of the sidewalls of the enclosure. For achieving the best effect on noise reduction it is best to locate the air-inlets as far and away from the user as possible, thus in some embodiments all air-inlets are located in the back of the enclosure.

The fact that the air-outlet is located at the bottom and the at least one air inlet is located on the sidewall dictates that the air-inlet is elevated with respect to the air-outlet. This allows a linear and optionally horizontal configuration of the air refrigerating cycle components: an optional coarse air filter is located proximal to the air-inlet. A fine air filter is located downstream the air inlet and proximal to the air-entry of a heat exchanger evaporator located downstream the air filter, the evaporator comprises air outlets, the condenser is located downstream the evaporator, and the blower is located downstream the condenser and positioned so that its rotation axis is relatively vertical, i.e. up to 30° with respect to the gravity lines. In some embodiments the order of the blower and the condenser is reversed so the condenser is positioned downstream the blower. In some embodiments the longitudinal axis of all aforementioned components (except the apparatus' air inlet and the evaporator) are oriented horizontally or substantially horizontally to the ground. In some embodiments the heat exchanger evaporator is positioned with a tilt with respect to the ground in order to force the generated water to flow in a certain direction gravitationally.

According to the above described arrangement of the refrigeration cycle, upon its operation, the motivated air flows in the following sequence: an airflow enters the air inlet and through an optional first filter, then through a passage toward evaporator, then vertically (with respect to the round) through the air filter proximal to the evaporator, then it curves horizontally through the air inlet of the evaporator into the evaporator where it is cooled to below its dew point and water is generated, then curves again, to flow vertically through the outlets of the evaporator, and then it flows vertically through the condenser, then through the enclosure outlet and vertically to the blower (or first through the blower and then through the condenser in some embodiments).

Uniform Airflow

Positioning the inlet on one of the sidewalls and sucking the air by motivating air with a blower that is positioned in proximity to the bottom of the apparatus can create a difference in the flows upon the evaporator. Such difference reduces the efficiency and water production rate, because air in evaporator regions where the flow is too high might not be cooled enough below the dew point, and on the other hand, air in evaporator regions where the flow is too low will have small condensation rate (due to lack of airflow).

The inventors found three factors which contributes to uniformizing the flow upon the evaporator: (i) putting a horizontal porous bather such as a horizontal fine filter, in proximity to the air inlet of the evaporator(s) which increases the pressure drop upon the evaporator; (ii) distancing the blower from the outlet of the evaporator(s); and (iii) truncating the passage between the air inlet in the enclosure and the air inlet of the horizontal evaporator to from a passage having a triangle cross section. Therefore, the invention provides an AWG comprising a porous barrier, such as an air filter, which is positioned parallel and proximal to air entries of the evaporator of the water generation refrigeration cycle. When the air entries of the evaporator are tilted with respect to each other, the several porous barriers can be used each positioned parallel to the air entry of the evaporator it is facing, or a single porous barrier is used that is positioned parallel to the mean plain of all the entries. The invention further provides an AWG comprising a gap between the blower and the outlet of the evaporator such that the blower is located at the optimal distance that effectively uniformizes the flow. This distance would vary from on AWG to the other depending on the number of evaporators used, and type of blower, but the person of skill in the art would know how to find the optimal distance between the blower and the outlets of the evaporator by performing CFD calculations. The invention further provides an AWG having a passage for the airflow between the air inlet in the sidewall of the enclosure and the air entry on the evaporator which is confined (or truncated) by a diagonal surface which begins above the air inlet of the enclosure and ends at the opposite wall in proximity to the evaporator air entries (or in proximity to the air-filter adjacent to the evaporator, when applicable). This diagonal surface together with plane of the evaporator air-filter (or air entries) and the plane of the air inlet in the enclosure, define a passage having a triangular cross-section. The triangle cross-section assists in uniformizing the flow lines of the incoming air flow.

Circular Condenser Downstream the Blower

In another aspect the invention provides an AWG comprising a condenser and blower wherein the condenser is positioned downstream the blower. In some embodiments the condenser at least partially surrounds the blower. In some embodiments the condenser is aligned with the blower to receive the airflow exiting the blower. In some embodiments the condenser is positioned downstream the air-outlet of the enclosure. In some embodiments the blower is a circular blower as known in the art. In some embodiments the blower is a circular blower being positioned around a blower and aligned to receive the airflow exiting the blower, downstream the air-outlet of the enclosure. The condenser is designed to be generally annular such that the cavity inside the annular structure is wide enough to accommodate a blower. This structure has a potential to reduce the size of the AWG since blower volume and two plenums (one downstream and one upstream the condenser), can be saved. The air blown by the blower through the condenser in this arrangement, cools the condenser when operating the refrigeration cycle of the AWG. The circular shape is not mandatory for this embodiment, one can use a rectangular, rounded edges or any other suitable condenser that surrounds the blower outlet.

Electrical Circuit

In another aspect the invention provides an AWG wherein the blower that is used for the water condensation motivates the airflow over the electricity circuit panel of the apparatus. The electricity panel is located along the airflow between the air inlet and the evaporator or between the evaporator and the outlet of the enclosure. This configuration utilizes the air flow to chill the electrical panel of the apparatus and by that—to prolong its lifespan, to reduce malfunctions and to reduce energy consumption. In some embodiments the electricity circuit panel is placed right after the air-inlet with respect to the air flow direction, and in some embodiments downstream the air filter that is located at the air-inlet. This allows easy access to the electricity circuit, by only needing to remove the air filter in case of maintenance or repair. In some embodiment, the electrical circuit is split into several separate components, wherein at least one heat dissipating circuit is located in the airflow as described.

Specific Embodiments

Figure 1A:
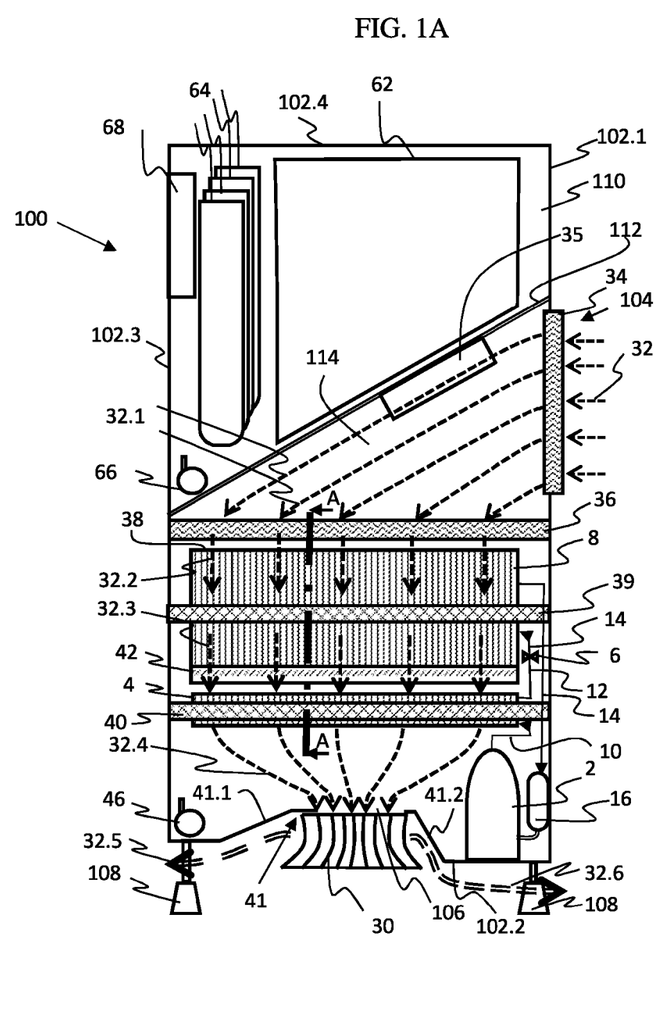
FIG. 1A depicts a block diagram of an AWG according to embodiments of the invention.
Figure 1B:
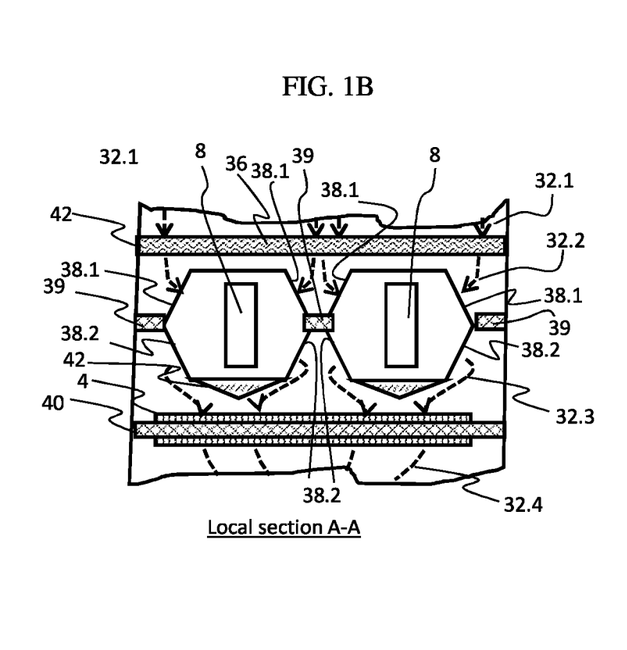
FIG. 1B depicts a block diagram of a local cross section along line A-A in FIG. 1A of an AWG according to embodiments of the invention.

Reference is now made to FIGS. 1A and 1B depicting an AWG apparatus 100 according to an embodiment of the invention. The apparatus should comprise many components that for sake of convenience are not shown in FIG. 1 or the figures to come such as a utility line, controller, temperature sensor(s), push button(s) and some other control means. A person skilled in the art would know how to extrapolate the details provided herein into a fully operative AWG. The apparatus 100 comprises an enclosure 102 having a back sidewall 102.1, a bottom wall 102.2, a front wall 102.3 and a top wall 102.4, an environment air inlet 104 (equipped with a coarse air filter 34) and air outlet 106. The enclosure is connected to a set of legs 108 which elevate the bottom wall 102.2 from the ground and enable leveling the apparatus. The enclosure 102 accommodates a water generating refrigeration cycle, and a generated water system.

Some of the volume occupying components of the generated water system such as a potable water storage tank 62, water filters 64 and water pump 66 are located in a top compartment 110 that is defined by a top portion of the backwall 102.1, a top portion of the front wall 102.3, the top wall 102.4 and a diagonal surface 112. The top compartment 110 also accommodates the human-machine interface (HMI) panel 68.

The water generating refrigeration cycle comprises a compressor 2, condenser 4, evaporator expansion means 6, a set of two evaporators 8 in an evaporator assembly, and a set of refrigerant tubes 10, 12, 14, and 16. When the water generation refrigeration cycle operates, a refrigerant gas is compressed in the compressor 2. The compressed refrigerant gas travels in refrigerant line 10 to the condenser 4 where it condenses into a liquid. The condensed liquid travels out of condenser 4 through refrigerant line 12 to an expansion mean 6 (e.g. capillary tube, expansion valve), where it turns into a liquid-gas cold mixture and enters the evaporator heat exchangers 8 in where it evaporates. After exiting the evaporator heat exchanger 8, the refrigerant in gas phase is transferred through a suction accumulator 16 back to the compressor 2 to complete the cycle.

A blower 30 is located near the air outlet 106 in a cavity 41 defined by cavity sidewalls 41.1 and 41.2 which are part of the bottom wall surface 102.2. The sidewalls 41.1 and 41.2 define an inverse tapered uneven cavity, wherein the wall of the cavity 41.2 proximal to the back sidewall 102.1 has a bigger gradient and ends lower than wall 41.1. Thus, the blower 30 is more hindered from the back of the apparatus 100 than from the front. When operating, the blower 30 motivates (when active) an air flow 32 to enter the enclosure through the air inlet 104 where it passes through an air filter 34, which removes particles and may also absorb chemical contaminants. Then air flow 32.1 flows towards the fine filter 36 through a confined passage 114 having a triangular cross section defined by the plane of the air entry 104, the plane of the fine filter 36 and the diagonal surface 112. The triangular space 114 dictates more or less uniform airflow lines of airflow 32.1. The airflow 32.1 then flows through a fine filter 36 which is positioned horizontally and in proximity to the air inlet pathway 38.1 of the evaporator assembly 8. The evaporator assembly 8 is positioned at an optimal distance from the blower 30 to allow uniformizing of the air flow 32.1 and 32.2 which enters the evaporator assembly. A portion of airflow 32.1 passes over the electricity circuit panel 35 and removing excess heat therefrom. The evaporator assembly 8 in this embodiments is a set of two plates heat exchangers each encompassing a fins and tubes heat exchanger. Each plates heat exchanger comprising two separate sets of inlet pathways through which airflow 32.1 enters, and two separate sets of outlet pathways through which airflow 32.3 exits. After entering the air inlet pathway 38.1, air flow 32.2 makes a turn in the air inlet pathway 38.1 and is directed to the evaporator assembly 8. Air flow 32.2 then flows through the evaporator 8, where the temperature of the airflow 32.2 is reduced below its dew point, shelling off some moisture which condenses into water droplets. The airflow 32.2 is precooled in the air inlet pathway 38.1 by air flowing in the air outlet pathway as the two pathways are in heat exchange propinquity. After flowing through the evaporator assembly 8 the airflow is directed by the air outlet pathway 38.2 to flow towards the air out let of the enclosure. Note that the evaporators 8 are oriented vertically to the ground and the air flow 32.1 arriving from the air inlet 34 of the enclosure needs to make turn in order to flow perpendicularly to the evaporator large plane which is most efficient for heat exchange. Posing the evaporator this way, allows condensation drops to drip beneath it and to be collected by the sump below it.

The relatively cooled and dry airflow 32.3 exits the air outlet pathways 38.2 of the evaporator assembly (two outlets for each heat exchanger). and further flows through the condenser 4, in which it is being heated and then flows out of the enclosure 102 through the air outlet 106. A first separation plate 39 placed horizontally along the space between the middle line of the evaporator assembly, prevents mixing of the relatively cold and dry air 32.3 with the relatively warm and humid airflow 32.2. Similarly, a second separation plate 40 encircles the condenser thus preventing the relatively warm and dry airflow 32.4 that exits the condenser from mixing with the relatively cold and dry airflow 32.3 before it enters the condenser.

The blower 30 which is proximal and downstream the air outlet 106, is a centrifugal blower which blows the air horizontally and radially sideways. The airflow that exits the blower 30 encounters the bottom surface cavity walls 41.1 and 41.2 which define a larger outlet in the front of the apparatus than the back (and similarly to the sides, not shown), so a larger portion of the airflow exits the machine from the front rather than the back. In some embodiments, the blower 4 can be located in any suitable position along flow-line 32.

The water droplets that are generated by the evaporator 8 are collected gravitationally in a water sump 42. The latter is part of the hydraulic water system which will not be detailed here and includes intra alia water collection pump 46. The latter motivates the collected water though conduits, filters and other optional components to the potable water storage tank 62.

Figure 2A:
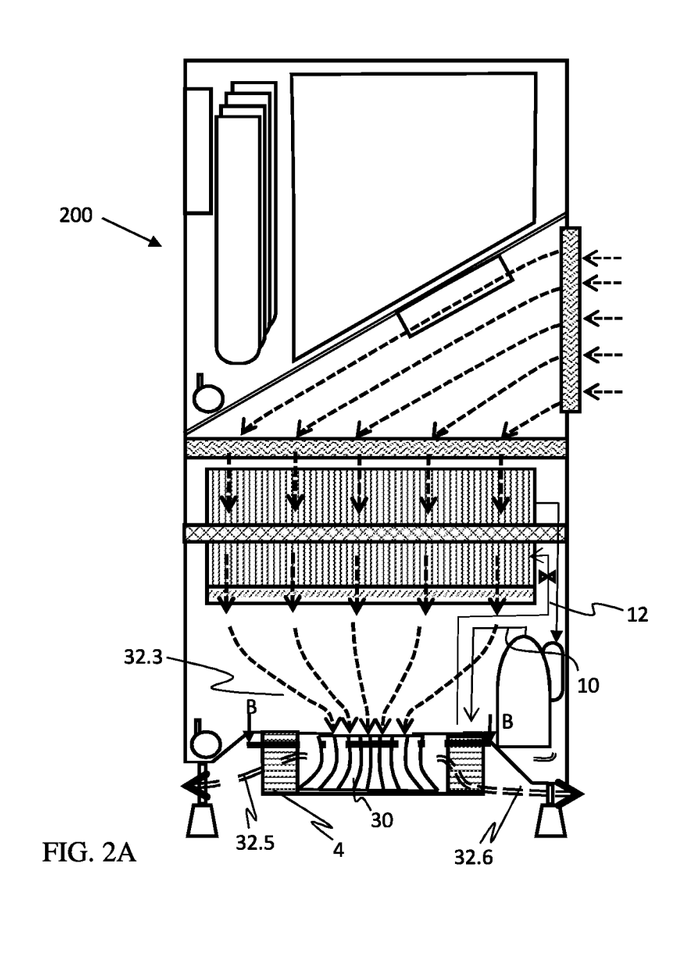
FIG. 2A depicts a block diagram of an AWG according to embodiments of the invention.
Figure 2B:
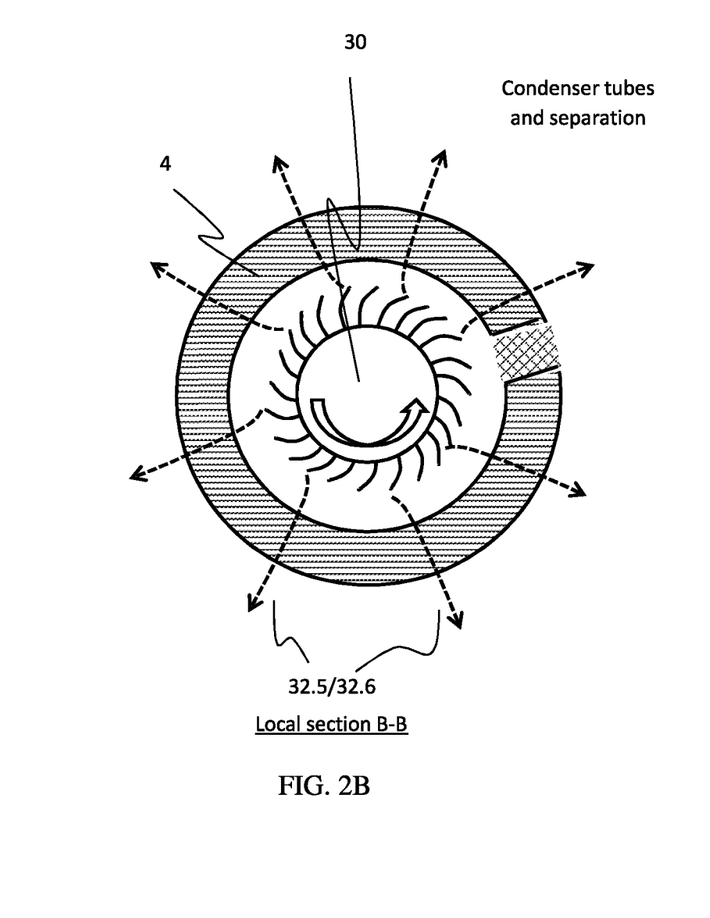
FIG. 2B depicts a block diagram of a local cross section along line B-B in FIG. 2A of an AWG according to embodiments of the invention.

Reference is now made to Figure Nos 2A and 2B depicting an AWG according to another embodiment of the present invention. AWG 200 comprises the same components (except for the second separation plate which becomes redundant, as will be understood below) and connectivity as in AWG 100 so the equivalent components are not annotated for sake of simplicity and clarity). They and differ by the relative configuration of the condenser 4 and the blower: in the AWG apparatus 200 the condenser 4 is a circular condenser and is placed around the blower 30. As such, heat is removed from the condenser by the air flow 32.5 and 32.6 blown away from the blower 30. This saves volume, reduces AWG sizes and eliminates the need to protect children from touching the blower when the blower is positioned in one of the sidewalls. In some embodiment, the condenser is protected with coarse net against hits from beneath or during transportation.

Figure 3:
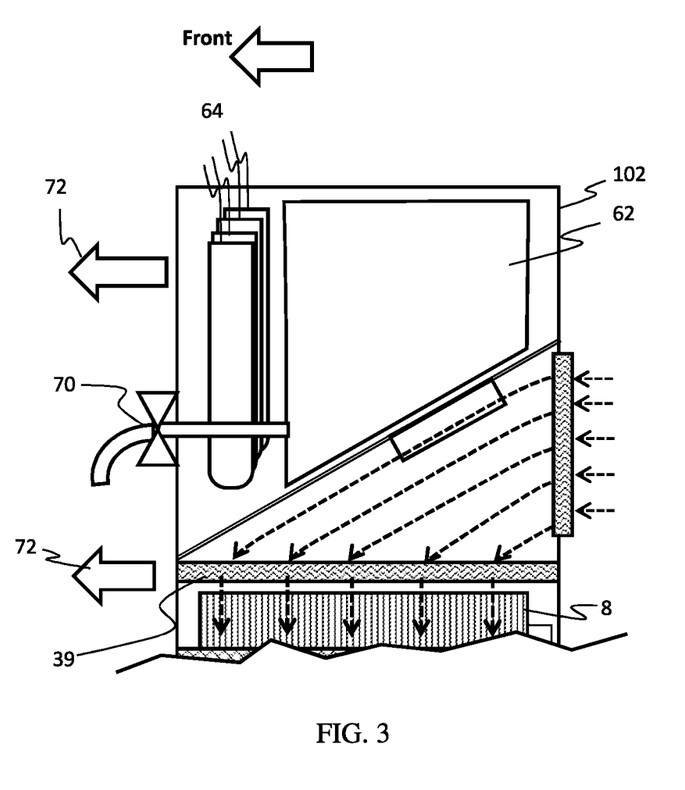
FIG. 3 depicts a partial block diagram of an AWG according to embodiments of the invention.

Reference is now made to FIG. 3 depicting two more features to an AWG that are provided by the present invention. The placement of the potable water storage tank 62 in the top compartment enables the installation of a gravitational dispensing tap 70 that is operated without the aid of a water dispensing pump. In addition, locating the cooled water tank near the dispensing tap enables to shorten the dispensing tube. Consequently, water dispensed from the tank toward the tap has a shorter travel so it does not heat much on the way. After dispensing, a smaller volume of standing water remains in the tube because it is shorter.

In order to facilitate maintenance of the apparatus, filters of the apparatus (in some embodiments—all filters) are located in the front section of the top compartments, and may be pulled out front-wise 72 so they are conveniently approached and replaced at need. The horizontal fine particle air filter is made accessible by embedding it into any drawing means such as a drawer, a frame attached to a knob so that it can also be conveniently pulled from the front side of the AWG to the front direction 72.

What is claimed is:

1. An AWG comprising an enclosure, an evaporator assembly, a condenser and a blower,
the enclosure comprising:
a bottom wall, sidewalls, top wall, at least one air inlet, and at least one air outlet, wherein
at least one enclosure air inlet is located at one of the sidewalls or top wall,
at least a portion of the bottom wall is elevated from the ground, and
the at least one enclosure air outlet is located at the elevated portion of the bottom wall;
the evaporator assembly comprising:
an air inlet pathway, an evaporator and an air outlet pathway, wherein:
the air inlet pathway is adapted to receive an airflow from the enclosure air inlet and direct the air flow to flow through the evaporator, the air outlet pathway adapted to receive the airflow from the evaporator and direct the airflow to the enclosure air outlet;
the enclosure accommodates the evaporator assembly, the blower is located at the enclosure air outlet or in proximity thereto, the blower and the condenser are located downstream of the evaporator assembly, the evaporator assembly is located downstream of the enclosure air-inlet, and the AWG is configured to direct the airflow from the enclosure air inlet through the evaporator assembly, and down to exit through the enclosure air outlet at the bottom wall, and further comprising a refrigeration cycle comprising:
an air filter located downstream of the enclosure air inlet and proximal to a heat exchanger evaporator, the heat exchanger evaporator is located downstream of the air filter, the evaporator comprising an evaporator air inlet and an evaporator air outlet,
a condenser located downstream of the evaporator, and the blower is located downstream of and parallel to the condenser,
such that, when the refrigeration cycle is operating, an air flow enters the air inlet, then through the air filter proximal to the evaporator, then through the evaporator air inlet to the evaporator where it is cooled to below its dew point and water is generated, then through the evaporator outlet to the condenser, then through the enclosure outlet and the blower.

2. The AWG according to claim 1 wherein the air filter is located proximal to the evaporator, and wherein the evaporator, the condenser and the blower are oriented horizontally.

3. The AWG according to claim 1 wherein the blower is adapted to direct air flow exiting the AWG to flow parallel to the ground.

4. The AWG according to claim 1 wherein the blower is located downstream the air outlet.

5. The AWG according to claim 1 further comprising legs defining a gap between the ground and the bottom.

6. The AWG according to claim 1 wherein the blower having a top side, a bottom side and a lateral side is positioned in a cavity defined by the surface of the bottom wall such that the lateral side of the blower is at least partially hindered by the enclosure.

7. The AWG according to claim 6 wherein the cavity is adapted to allow less airflow to exit through the side of the enclosure comprising the air inlet than airflow exiting the other sides of the enclosure.

8. The AWG according to claim 1 wherein the bottom portion of at least one sidewall comprises an opening allowing the air exiting the air outlet to flow through.

9. The AWG according to claim 1 wherein the at least one air inlet is elevated relative to at least one air outlet.

10. The AWG according to claim 1 further the sidewall of the enclosure comprising at least one air inlet is connected below the air inlet to a barrier surface extending laterally and outwardly from the sidewall.

11. The AWG according to claim 1 wherein the evaporator is a heat exchanger comprising at least two separate sets of entries, at least two pre-cooling zones a cooling zone, at least two post-heating zones and at least two separate sets of outlets.

12. An AWG comprising an enclosure, an evaporator assembly, a condenser and a blower,
the enclosure comprising:
a bottom wall, sidewalls, top wall, at least one air inlet, and at least one air outlet, wherein
at least one enclosure air inlet is located at one of the sidewalls or top wall,
at least a portion of the bottom wall is elevated from the ground, and
the at least one enclosure air outlet is located at the elevated portion of the bottom wall;
the evaporator assembly comprising:
an air inlet pathway, an evaporator and an air outlet pathway, wherein:
the air inlet pathway is adapted to receive an airflow from the enclosure air inlet and direct the air flow to flow through the evaporator, the air outlet pathway adapted to receive the airflow from the evaporator and direct the airflow to the enclosure air outlet;
the enclosure accommodates the evaporator assembly, the blower is located at the enclosure air outlet or in proximity thereto, the blower and the condenser are located downstream of the evaporator assembly, the evaporator assembly is located downstream of the enclosure air-inlet, and
the AWG is configured to direct the airflow from the enclosure air inlet through the evaporator assembly, and down to exit through the enclosure air outlet at the bottom wall, and
further comprising a condenser, wherein the condenser is positioned downstream the blower.

\* \* \* \* \*